May 1, 1934.  C. ELLIS  1,956,567
PROCESS OF WATERCYCLE AQUOLYZATION
Filed May 31, 1930
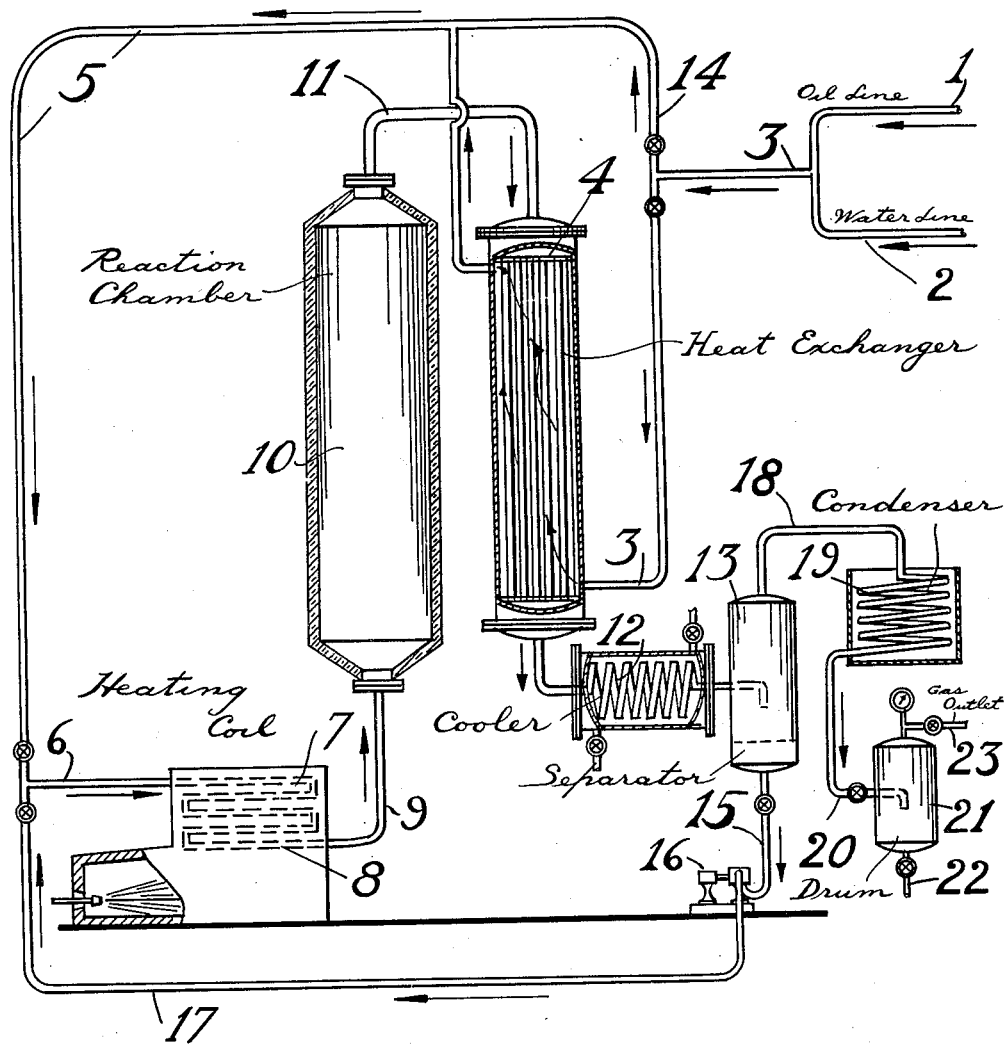
Carleton Ellis Inventor
W. E. Currie Attorney Patented May 1, 1934

1,956,567

UNITED STATES PATENT OFFICE 1,956,567

PROCESS OF WATERCYCLE AQUOLYZATION

Carleton Ellis, Montclair, N. J., assignor to Standard Oil Development Company, a corporation of Delaware Application May 31, 1930, Serial No. 458,919

7 Claims. (Cl. 196—64)

This invention relates to a process of aquolyzing petroleum hydrocarbons such, for example, as heavy hydrocarbons, including those of the gas oil type, in which water used for aquolyzation is recycled through a heating zone in such a manner as to conserve a great part of the heat initially imparted to it in the aquolyzing step.

When aquolyzation is carried on under most desirable conditions of yield of low boiling liquid hydrocarbons, a proportion of water considerably in excess of that of the oil preferably is used. Thus three to five parts by weight of water may be used to one part of oil. A mixture of this character is forced through a heating zone maintained under high pressure at an aquolyzing temperature to bring about the reconstitution of the heavier oil, thus yielding lighter liquid products. Very little, if any, of the water enters into the reaction, at least to the extent of disappearance by combination. As a result a large body of water must be heated to the aquolyzing temperature, which may range from 900 to 1300° F. The present process provides for separation of the water from the oil after aquolyzation and conveyance of the water while still in a highly heated state back to the reaction zone, there to be admixed with a fresh supply of raw oil, with or without an additional quantity of make-up water.

The drawing is a diagrammatic representation of one type of apparatus suitable for the herein described process.

A suitable oil is supplied under pressure by line 1. Water is supplied by line 2, also under pressure. Suitable quantities of oil and water are mixed in line 3 and are passed through heat exchanger 4 in indirect heat exchange with the products of the reaction and then by lines 5 and 6 through heating coil 7 in coil setting 8. The preheated mixture then passes through line 9 into the reaction chamber 10, which is constructed of suitable materials to withstand the high temperatures and pressures used. This chamber is preferably insulated to prevent undue loss of heat and may also be heated directly by suitable means such as by electric heaters (not shown). The reaction products leave this chamber by line 11 and are passed through heat exchanger 4 and cooler 12 into separator 13. The cooler 12 is used only to liquefy the water in the reaction products and is not necessary in the event that heat exchanger 4 has sufficient capacity for this purpose. The operation of heat exchanger 4 may be controlled, as by the use of by-pass line 14 on the feed.

The liquefied water is separated from the oily products in separator 13 and is separately withdrawn therefrom by line 15 and is recycled by pump 16 and line 17, which may be suitably insulated to prevent loss of heat, if desired.

The oily products leave separator 13 by line 18 and are cooled in condenser 19 and passed by line 20 to drum 21 from which they may be withdrawn to storage (not shown) by line 22. A vent 23 is provided for removal of fixed gases.

The oil and water, as stated, may be introduced into the reaction zone as a mixture or emulsion or, if desired, the oil and water may be separately introduced and, if desired, after first passing through heat exchanger and/or preheaters. The products of aquolyzation leaving the reaction zone may pass through a heat exchanger to give up a certain part of their heat to the oil and water fed to said zone.

The pressure employed in the reaction zone and the water-cycle path is ordinarily at or above critical pressure. The temperature likewise, as indicated, will be above the critical temperature of water. With oil and water both above their critical temperatures and pressures, substantially complete miscibility may be expected, permitting intimate contact of water and oil and allowing the reaction of aquolyzation to take place under most favorable conditions. If, however, after aquolyzation the products are cooled somewhat so that the temperature falls below the critical temperature of water, for example, if the temperature is allowed to fall to 400–500° F., the critical pressure being maintained, water assumes a liquid form with separation of the oil and the latter may be withdrawn for distillation to separate the light hydrocarbons for use as motor spirit or other purposes. The liquid water at this temperature then may be returned to the reaction zone to mingle with an entering charge of fresh oil. If desired, the hot liquid water may be passed through a heat exchanger and a preheater, raising the temperature thereby to above the critical temperature. The water thus is transformed from a liquid to a non-liquid or vapor condition, but without absorption of heat as latent heat. At some point in the path of travel suitable for the particular purpose at hand, the oil or oil vapors, as the case may be, are mingled with the water vapor and the mixture subjected to aquolyzing conditions.

An example will illustrate the process.

Force gas oil and water in the proportion of one part by weight of oil to 4 parts water, through a heat exchanger and preheater into a reaction zone, there heating the charge to approximately 1000° F. while maintaining the system under about 3000-3500 lbs. pressure. Expose the reaction mixture in the heating zone for a period of 20 seconds. Allow the products leaving the reaction zone to pass through a heat exchanger to cool slightly below the critical temperature, whereby water separates in liquid form, such temperature preferably being 400-500° F. Without release of pressure, separate the oil and convey the liquid water with its charge of heat, and preferably substantially without loss thereof, again to the reaction zone, first heating further by heat exchange and/or preheating as required. Mix the hot recycled water with the feed oil at some point prior to or at the reaction zone. The pressure on the oil so separated may then be removed with simultaneous or subsequent distillation to separate into fractions appropriate for motor spirit and other purposes. Ordinarily the operation is conducted to convert from one-half to three-fourths or more of the heavy oil into liquid hydrocarbons boiling below 430 or 450° F.

By this water-cycle oil-treating process the oil may be exposed to the high temperature of aquolyzation in the presence of a rather larger proportion of water without waste of this water and without loss of but a small proportion of the heat applied to the system.

While this process is preferably carried out with water alone, or with aqueous material capable of being readily brought to a liquid state in an analogous manner, I may, in some cases, employ ammonia or a mixture of ammonia and water. When using ammonia or a mixture of ammonia and water I may, in some cases, employ catalytic material to facilitate a moderate degree of union of ammonia with some of the hydrocarbons or other substances present in the oil for the purpose of forming amines or similar compounds useful in reducing engine knock. When oils having sulphur compounds which react at these temperatures and pressures with ammonia to form ammonium sulphid are being treated, the latter preferably should be removed and recovered. In other cases the catalytic material may be absent, the combination of ammonia with the components of the petroleum oil being facilitated to the desired degree by modification of temperature and pressure.

What I claim is:

1. The water-cycle aquolyzing process which comprises passing a heavy petroleum oil of the gas oil type with a larger proportion of water through a reaction zone at a temperature and pressure above the critical for water, cooling to a temperature slightly below the critical for water while maintaining pressure whereby separation of oil from liquid water occurs, withdrawing the oil and returning the separated water substantially without further cooling to the reaction zone with a fresh quantity of oil.

2. The water-cycle oil-treating process which comprises passing a heavy petroleum oil with several times its weight of water through a reaction zone at a temperature and pressure above the critical for water, cooling to a temperature slightly below the critical for water while maintaining pressure whereby separation of oil from liquid water occurs, withdrawing the oil and returning the separated water without substantial loss of heat to the reaction zone with a fresh quantity of oil.

3. The water-cycle oil-treating process which comprises passing a water solution of a heavy petroleum oil through a reaction zone at a temperature and pressure above the critical for water, cooling to a temperature slightly below the critical for water while maintaining pressure whereby separation of oil from liquid water occurs, withdrawing the oil and returning the separated water without substantial loss of heat to the reaction zone with a fresh quantity of oil.

4. The water-cycle aquolyzing process which comprises subjecting a heavy petroleum oil, with at least an equal amount of water, to a temperature and pressure above the critical for water, whereby the heavier oil is converted to a substantial degree into lighter volatile liquid hydrocarbons of the motor spirit type, withdrawing the products from the reaction zone and cooling to a temperature slightly below the critical for water while still maintaining the pressure at least equal to the critical pressure; whereby separation of oil from liquid water occurs withdrawing the oil and returning at least the major portion of the separated water without substantial loss of heat, together with a fresh quantity of the oil, to the reaction zone.

5. The water-cycle oil-treating process which comprises passing a heavy petroleum oil of the gas oil type, with at least an equal amount of water, through a reaction zone at a temperature and pressure above the critical for water, whereby the heavier oil is converted to a substantial degree into lighter volatile liquid hydrocarbons of the motor spirit type, withdrawing the products from the reaction zone and cooling to a temperature slightly below the critical for water while still maintaining the pressure at least equal to the critical pressure; whereby separation of oil from liquid water occurs, withdrawing the oil and returning at least the major portion of the separated water without substantial loss of heat, together with a fresh quantity of the oil, to the reaction zone.

6. The water-cycle oil-treating process which comprises passing a gas oil, with several times its weight of water, through a reaction zone at a temperature and pressure above the critical for water, whereby the heavier oil is converted to a substantial degree into lighter volatile liquid hydrocarbons of the motor spirit type, withdrawing the products from the reaction zone and cooling to a temperature somewhat below the critical for water while still maintaining the pressure at least equal to the critical pressure; whereby separation of oil from liquid water occurs, withdrawing the oil and returning at least the major portion of the separated water with its residual heat, together with a fresh quantity of the oil, to the reaction zone.

7. A process according to claim 1 which comprises the step of preheating the oil-and-water charge entering the reaction zone.

CARLETON ELLIS.